(12) United States Patent
Pappu et al.

(10) Patent No.: US 10,042,729 B2
(45) Date of Patent: Aug. 7, 2018

(54) APPARATUS AND METHOD FOR A SCALABLE TEST ENGINE

(71) Applicants: Lakshminarayana Pappu, Folsom, CA (US); Robert De Gruijl, San Francisco, CA (US); Suketu U. Bhatt, Folsom, CA (US); Robert P. Adler, Santa Clara, CA (US); R Selvakumar Raja Gopal, Tapah (MY); Rius Tanadi, Sacramento, CA (US)

(72) Inventors: Lakshminarayana Pappu, Folsom, CA (US); Robert De Gruijl, San Francisco, CA (US); Suketu U. Bhatt, Folsom, CA (US); Robert P. Adler, Santa Clara, CA (US); R Selvakumar Raja Gopal, Tapah (MY); Rius Tanadi, Sacramento, CA (US)

(73) Assignee: Intel Corporation, Santa Clara, CA (US)

( * ) Notice: Subject to any disclaimer, the term of this patent is extended or adjusted under 35 U.S.C. 154(b) by 1 day.

(21) Appl. No.: 15/089,448

(22) Filed: Apr. 1, 2016

(65) Prior Publication Data

US 2017/0286247 A1 Oct. 5, 2017

(51) Int. Cl.
*G06F 11/273* (2006.01)
*G06F 17/50* (2006.01)
*G01R 31/319* (2006.01)

(52) U.S. Cl.
CPC .... *G06F 11/2736* (2013.01); *G01R 31/31915* (2013.01); *G06F 17/5045* (2013.01); *G06F 2217/14* (2013.01); *G06F 2217/66* (2013.01)

(58) Field of Classification Search
CPC ............. G06F 11/2736; G06F 17/5045; G06F 2217/66; G06F 2217/14; G01R 31/31915
See application file for complete search history.

(56) References Cited

U.S. PATENT DOCUMENTS 6,381,717 B1 * 4/2002 Bhattacharya ... G01R 31/31853
712/227
7,219,175 B1 5/2007 Davis et al.
(Continued)

OTHER PUBLICATIONS

M. Agrawal, M. Richter and K. Chakrabarty, "Test-Delivery Optimization in Manycore SOCs," in IEEE Transactions on Computer-Aided Design of Integrated Circuits and Systems, vol. 33, No. 7, pp. 1067-1080, Jul. 2014.*

(Continued)

*Primary Examiner* — Cynthia Britt
(74) *Attorney, Agent, or Firm* — Nicholson De Vos Webster & Elliott LLP

(57) ABSTRACT

An apparatus and method are described for a scalable testing agent. For example, one embodiment of a scalable test engine comprises: an input interface to receive commands and/or data from a processor core or an external test system, the commands and/or data to specify one or more test operations to be performed on one or more intellectual property (IP) blocks of a chip; a first circuit to establish communication with an IP block over an interconnect fabric, the first circuit to transmit the one or more test operations to the IP block responsive to the received commands and/or data, the IP block to process the test operations and generate results; and a second circuit to receive the results from the IP block over the interconnect fabric, the results to be provided from the second circuit to the processor core and/or the external test system for analysis.

25 Claims, 12 Drawing Sheets

(56) References Cited

U.S. PATENT DOCUMENTS

| | | | |
|---|---|---|---|
| 8,330,477 B1 | 12/2012 | Wu et al. | |
| 9,087,037 B2 | 7/2015 | Patil et al. | |
| 9,477,807 B1* | 10/2016 | Harper | G06F 17/5081 |
| 2001/0011345 A1* | 8/2001 | Shigeki | G06F 9/30145 |
| | | | 712/226 |
| 2007/0220456 A1 | 9/2007 | Duan et al. | |
| 2012/0232825 A1* | 9/2012 | Patil | G01R 31/31850 |
| | | | 702/117 |
| 2012/0233504 A1* | 9/2012 | Patil | G06F 11/2242 |
| | | | 714/30 |
| 2012/0233514 A1* | 9/2012 | Patil | G01R 31/31850 |
| | | | 714/734 |
| 2013/0268808 A1 | 10/2013 | Patil et al. | |
| 2015/0302126 A1 | 10/2015 | Hamid et al. | |
| 2017/0147681 A1* | 5/2017 | Tankersley | G06F 17/30525 |

OTHER PUBLICATIONS

S. K. Mohanty, S. Sengupta and S. K. Mohapatra, "Test bench automation to overcome verification challenge of SOC Interconnect," 2015 International Conference on Man and Machine Interfacing (MAMI), Bhubaneswar, 2015, pp. 1-4.*

P. Nsame, G. Bois and Y. Savaria, "Design and Test of Adaptive Computing Fabrics for Scalable and High-Efficiency Cognitive SoC Applications," 2014 IEEE 23rd North Atlantic Test Workshop, Johnson City, NY, 2014, pp. 48-51.*

International Search Report and Written Opinion for Application No. PCT/US2017/021274, dated May 24, 2017, 12 pages.

* cited by examiner

APPARATUS AND METHOD FOR A SCALABLE TEST ENGINE

BACKGROUND

Field of the Invention

This invention relates generally to the field of computer processors. More particularly, the invention relates to a system and method for a scalable test engine such as a testing agent for system-on-a-chip (SoC) and processor components.

Description of the Related Art

Computer architectures are moving from interfacing discrete components on a printed circuit board or through use of other package configurations, to integrating multiple components onto a single integrated chip, which is commonly referred to as a System on a Chip (SoC) architecture. SoCs offer a number of advantages, including denser packaging, higher speed communication between functional components, and lower temperature operation. SoC designs also provide standardization, scalability, modularization, and reusability.

SoC architectures present challenges with respect to verification of design and integration when compared with discrete components. For example, for many years personal computers employed the ubiquitous "North" bridge and "South" bridge architecture, wherein a central processing unit was interfaced to a memory controller hub (MCH) chip via a first set of buses, and the memory controller hub, in turn, was interfaced to an Input/Output controller hub (ICH) chip via another set of buses. Each of the MCH and ICH further provided interface to various system components and peripherals via further buses and interfaces. Each of these buses and interfaces adhere to well-established standards, enabling the system architectures to support modular designs. To ensure proper design, each of the individual or groups of components could be tested using test interfaces which are accessible through the device pins.

Modularity is also a key aspect of SoC architectures. Typically, the system designer will integrate various functional blocks, including functional blocks or components that are commonly referred to in the industry as Intellectual Property ("IP") cores, IP blocks, or simply IP. For the purposes herein, these functional blocks are referred to as IP blocks or simply "IP"; it will be understood that the terminology IP blocks or IP also covers IP cores and any other component or block generally known as IP, as would be understood by those in the SoC development and manufacturing industries. These IP blocks generally serve one or more dedicated functions and often comprise existing circuit design blocks that are licensed from various vendors or developed in-house. In order to integrate these IP blocks, various interfaces are designed into the SoC. These can be quite challenging, as the well-defined North bridge-South bridge architecture and its standardized interfaces are not practical or desirable for integration in the SoC.

To address this problem, new higher-speed and more modular interfaces have been developed such as the On-Chip Scalable Fabric (IOSF), designed by the assignee of the present application. Additionally, other fabric-based interfaces have been developed, including the Open Core Protocol (OCP), and ARM's AMBA (Advanced Microcontroller Bus Architecture) interface. On-chip interconnects such as IOSF interconnect fabrics employ a packetized layered communication protocol and support point-to-point interconnects between IP blocks, facilitating integration of heterogeneous IPs with standard IOSF interfaces.

BRIEF DESCRIPTION OF THE DRAWINGS

A better understanding of the present invention can be obtained from the following detailed description in conjunction with the following drawings, in which.

DETAILED DESCRIPTION

In the following description, for the purposes of explanation, numerous specific details are set forth in order to provide a thorough understanding of the embodiments of the invention described below. It will be apparent, however, to one skilled in the art that the embodiments of the invention may be practiced without some of these specific details. In other instances, well-known structures and devices are shown in block diagram form to avoid obscuring the underlying principles of the embodiments of the invention.

Exemplary Processor Architectures and Data Types

Figure 1:
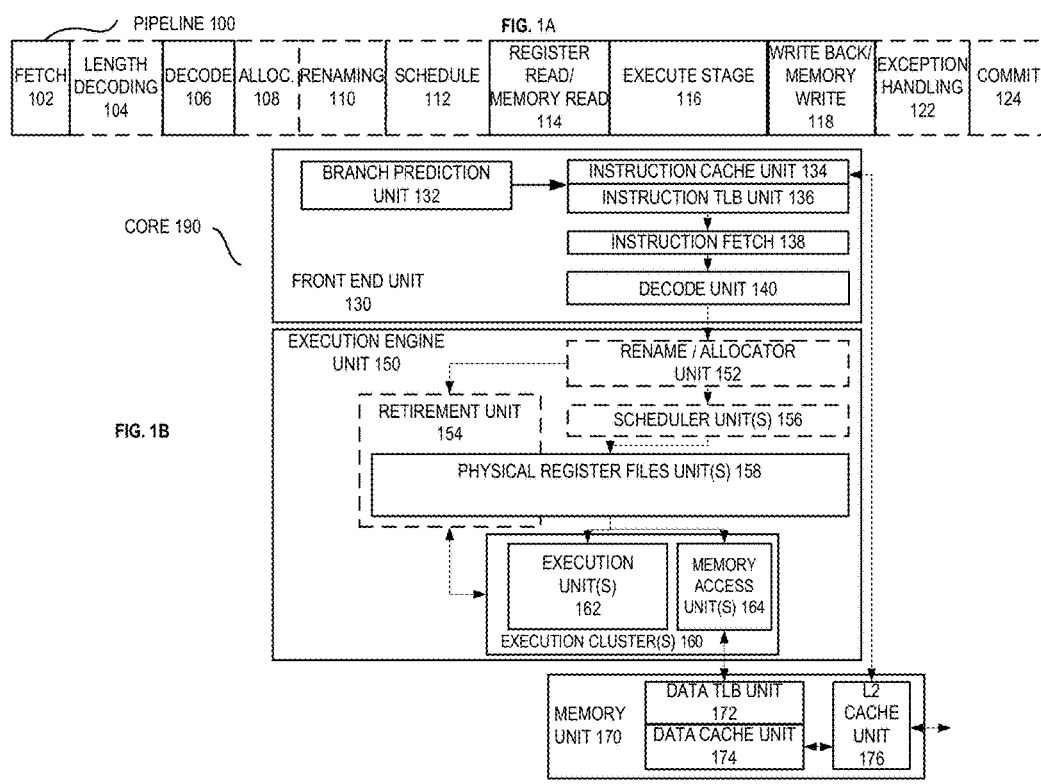
FIG. 1A is a block diagram illustrating both an exemplary in-order pipeline and an exemplary register renaming, out-of-order issue/execution pipeline according to embodiments of the invention.
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order fetch, decode, retire pipeline and an exemplary register renaming, out-of-order issue/execution pipeline according to embodiments of the invention. FIG. 1B is a block diagram illustrating both an exemplary embodiment of an in-order fetch, decode, retire core and an exemplary register renaming, out-of-order issue/execution architecture core to be included in a processor according to embodiments of the invention. The solid lined boxes in FIGS. 1A-B illustrate the in-order portions of the pipeline and core, while the optional addition of the dashed lined boxes illustrates the register renaming, out-of-order issue/execution pipeline and core.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit, a write mask registers unit, and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2, and/or some form of the generic vector friendly instruction format (U=0 and/or U=1), described below), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 2:
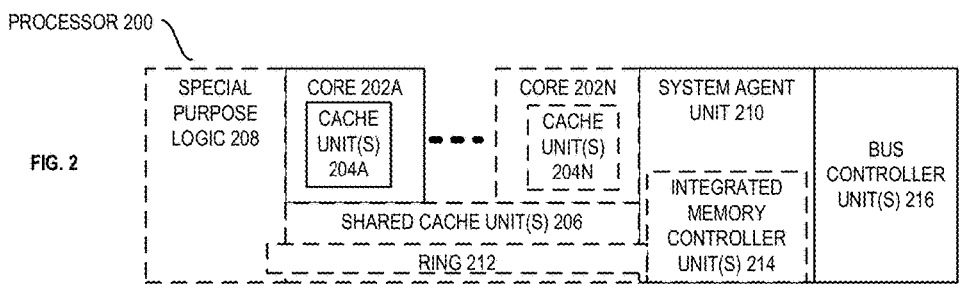
FIG. 2 is a block diagram of a single core processor and a multicore processor with integrated memory controller and graphics according to embodiments of the invention.

FIG. 2 is a block diagram of a processor 200 that may have more than one core, may have an integrated memory controller, and may have integrated graphics according to embodiments of the invention. The solid lined boxes in FIG. 2 illustrate a processor 200 with a single core 202A, a system agent 210, a set of one or more bus controller units 216, while the optional addition of the dashed lined boxes illustrates an alternative processor 200 with multiple cores 202A-N, a set of one or more integrated memory controller unit(s) 214 in the system agent unit 210, and special purpose logic 208.

Thus, different implementations of the processor 200 may include: 1) a CPU with the special purpose logic 208 being integrated graphics and/or scientific (throughput) logic (which may include one or more cores), and the cores 202A-N being one or more general purpose cores (e.g., general purpose in-order cores, general purpose out-of-order cores, a combination of the two); 2) a coprocessor with the cores 202A-N being a large number of special purpose cores intended primarily for graphics and/or scientific (throughput); and 3) a coprocessor with the cores 202A-N being a large number of general purpose in-order cores. Thus, the processor 200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 206, and external memory (not shown) coupled to the set of integrated memory controller units 214. The set of shared cache units 206 may include one or more mid-level caches, such as level 2 (L2), level 3 (L3), level 4 (L4), or other levels of cache, a last level cache (LLC), and/or combinations thereof. While in one embodiment a ring based interconnect unit 212 interconnects the integrated graphics logic 208, the set of shared cache units 206, and the system agent unit 210/integrated memory controller unit(s) 214, alternative embodiments may use any number of well-known techniques for interconnecting such units. In one embodiment, coherency is maintained between one or more cache units 206 and cores 202-A-N.

In some embodiments, one or more of the cores 202A-N are capable of multi-threading. The system agent 210 includes those components coordinating and operating cores 202A-N. The system agent unit 210 may include for example a power control unit (PCU) and a display unit. The PCU may be or include logic and components needed for regulating the power state of the cores 202A-N and the integrated graphics logic 208. The display unit is for driving one or more externally connected displays.

The cores 202A-N may be homogenous or heterogeneous in terms of architecture instruction set; that is, two or more of the cores 202A-N may be capable of execution the same instruction set, while others may be capable of executing only a subset of that instruction set or a different instruction set. In one embodiment, the cores 202A-N are heterogeneous and include both the "small" cores and "big" cores described below.

FIGS. 3-6 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 3:
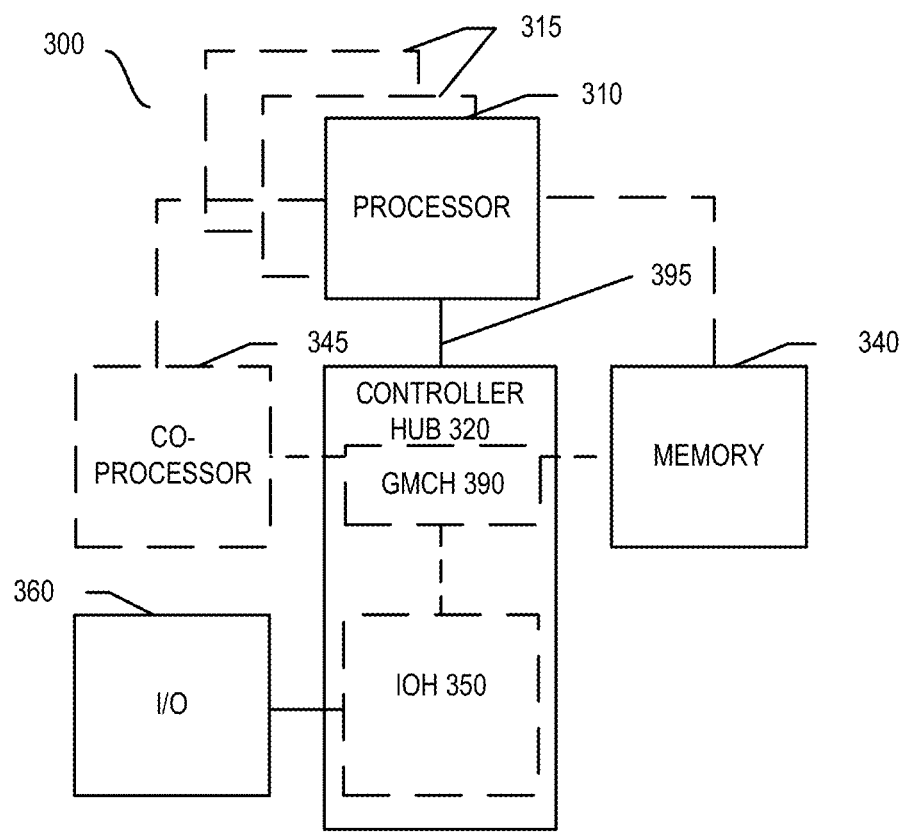
FIG. 3 illustrates a block diagram of a system in accordance with one embodiment of the present invention.

Referring now to FIG. 3, shown is a block diagram of a system 300 in accordance with one embodiment of the present invention. The system 300 may include one or more processors 310, 315, which are coupled to a controller hub 320. In one embodiment the controller hub 320 includes a graphics memory controller hub (GMCH) 390 and an Input/Output Hub (IOH) 350 (which may be on separate chips); the GMCH 390 includes memory and graphics controllers to which are coupled memory 340 and a coprocessor 345; the IOH 350 is couples input/output (I/O) devices 360 to the GMCH 390. Alternatively, one or both of the memory and graphics controllers are integrated within the processor (as described herein), the memory 340 and the coprocessor 345 are coupled directly to the processor 310, and the controller hub 320 in a single chip with the IOH 350.

The optional nature of additional processors 315 is denoted in FIG. 3 with broken lines. Each processor 310, 315 may include one or more of the processing cores described herein and may be some version of the processor 200.

The memory 340 may be, for example, dynamic random access memory (DRAM), phase change memory (PCM), or a combination of the two. For at least one embodiment, the controller hub 320 communicates with the processor(s) 310, 315 via a multi-drop bus, such as a frontside bus (FSB), point-to-point interface such as QuickPath Interconnect (QPI), or similar connection 395.

In one embodiment, the coprocessor 345 is a special-purpose processor, such as, for example, a high-throughput MIC processor, a network or communication processor, compression engine, graphics processor, GPGPU, embedded processor, or the like. In one embodiment, controller hub 320 may include an integrated graphics accelerator.

There can be a variety of differences between the physical resources 310, 315 in terms of a spectrum of metrics of merit including architectural, microarchitectural, thermal, power consumption characteristics, and the like.

In one embodiment, the processor 310 executes instructions that control data processing operations of a general type. Embedded within the instructions may be coprocessor instructions. The processor 310 recognizes these coprocessor instructions as being of a type that should be executed by the attached coprocessor 345. Accordingly, the processor 310 issues these coprocessor instructions (or control signals representing coprocessor instructions) on a coprocessor bus or other interconnect, to coprocessor 345. Coprocessor(s) 345 accept and execute the received coprocessor instructions.

Figure 4:
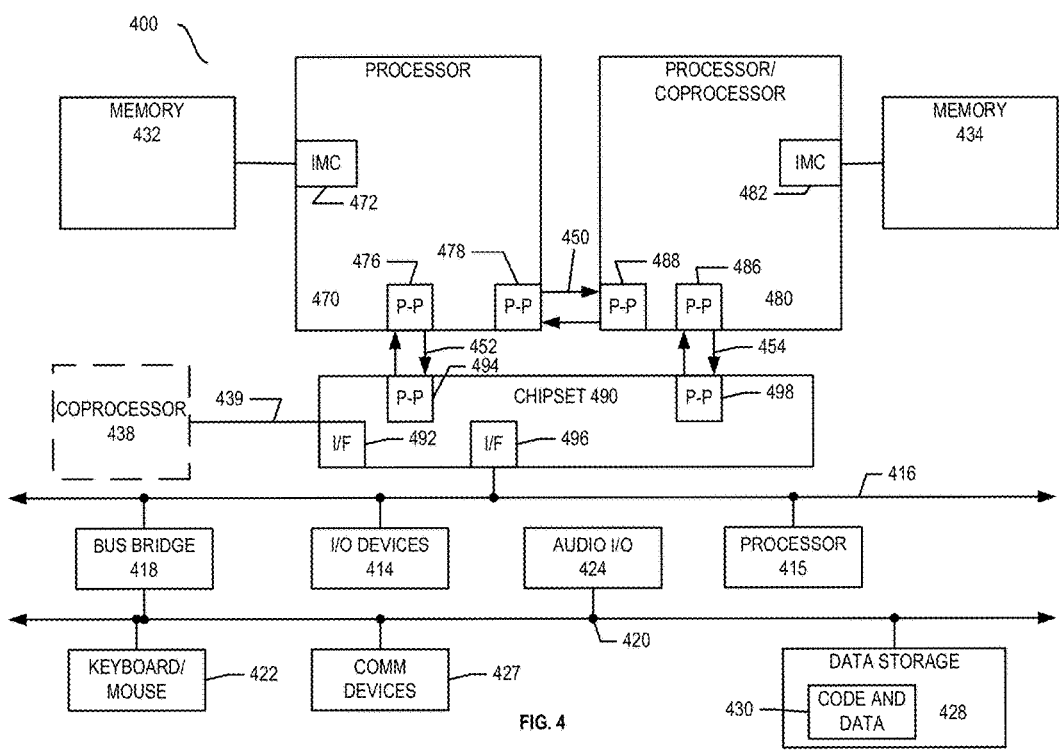
FIG. 4 illustrates a block diagram of a second system in accordance with an embodiment of the present invention.

Referring now to FIG. 4, shown is a block diagram of a first more specific exemplary system 400 in accordance with an embodiment of the present invention. As shown in FIG. 4, multiprocessor system 400 is a point-to-point interconnect system, and includes a first processor 470 and a second processor 480 coupled via a point-to-point interconnect 450. Each of processors 470 and 480 may be some version of the processor 200. In one embodiment of the invention, processors 470 and 480 are respectively processors 310 and 315, while coprocessor 438 is coprocessor 345. In another embodiment, processors 470 and 480 are respectively processor 310 coprocessor 345.

Processors 470 and 480 are shown including integrated memory controller (IMC) units 472 and 482, respectively. Processor 470 also includes as part of its bus controller units point-to-point (P-P) interfaces 476 and 478; similarly, second processor 480 includes P-P interfaces 486 and 488. Processors 470, 480 may exchange information via a point-to-point (P-P) interface 450 using P-P interface circuits 478, 488. As shown in FIG. 4, IMCs 472 and 482 couple the processors to respective memories, namely a memory 432 and a memory 434, which may be portions of main memory locally attached to the respective processors.

Processors 470, 480 may each exchange information with a chipset 490 via individual P-P interfaces 452, 454 using point to point interface circuits 476, 494, 486, 498. Chipset 490 may optionally exchange information with the coprocessor 438 via a high-performance interface 439. In one embodiment, the coprocessor 438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 490 may be coupled to a first bus 416 via an interface 496. In one embodiment, first bus 416 may be a Peripheral Component Interconnect (PCI) bus, or a bus such as a PCI Express bus or another third generation I/O interconnect bus, although the scope of the present invention is not so limited.

As shown in FIG. 4, various I/O devices 414 may be coupled to first bus 416, along with a bus bridge 418 which couples first bus 416 to a second bus 420. In one embodiment, one or more additional processor(s) 415, such as coprocessors, high-throughput MIC processors, GPGPU's, accelerators (such as, e.g., graphics accelerators or digital signal processing (DSP) units), field programmable gate arrays, or any other processor, are coupled to first bus 416. In one embodiment, second bus 420 may be a low pin count (LPC) bus. Various devices may be coupled to a second bus 420 including, for example, a keyboard and/or mouse 422, communication devices 427 and a storage unit 428 such as a disk drive or other mass storage device which may include instructions/code and data 430, in one embodiment. Further, an audio I/O 424 may be coupled to the second bus 420. Note that other architectures are possible. For example, instead of the point-to-point architecture of FIG. 4, a system may implement a multi-drop bus or other such architecture.

Figure 5:
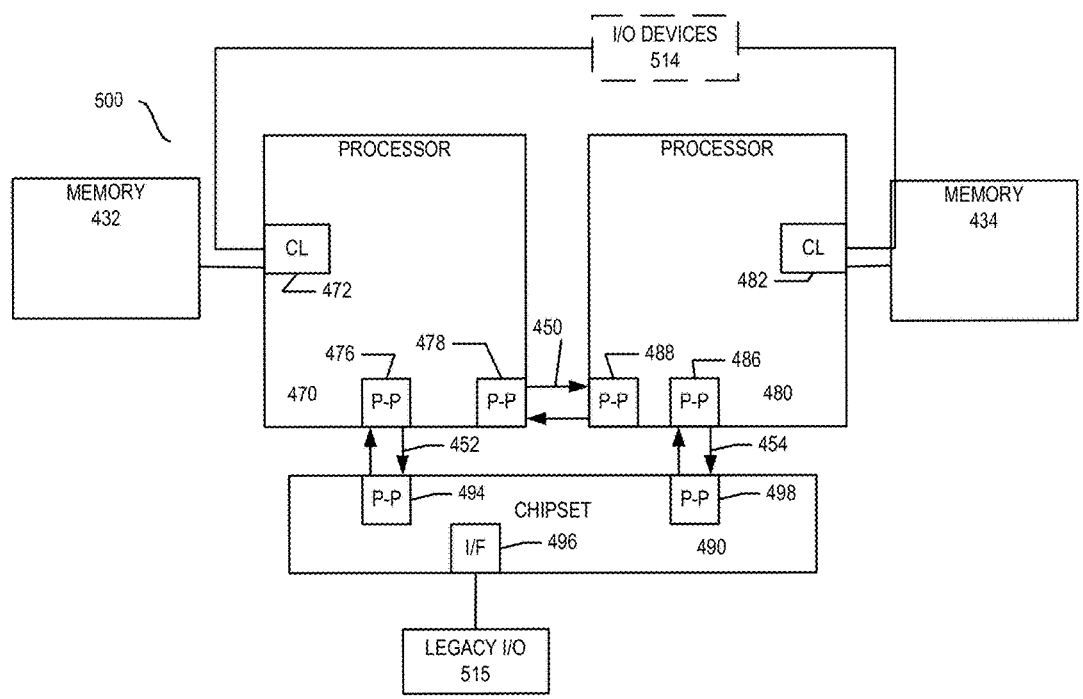
FIG. 5 illustrates a block diagram of a third system in accordance with an embodiment of the present invention.

Referring now to FIG. 5, shown is a block diagram of a second more specific exemplary system 500 in accordance with an embodiment of the present invention. Like elements in FIGS. 4 and 5 bear like reference numerals, and certain aspects of FIG. 4 have been omitted from FIG. 5 in order to avoid obscuring other aspects of FIG. 5.

FIG. 5 illustrates that the processors 470, 480 may include integrated memory and I/O control logic ("CL") 472 and 482, respectively. Thus, the CL 472, 482 include integrated memory controller units and include I/O control logic. FIG. 5 illustrates that not only are the memories 432, 434 coupled to the CL 472, 482, but also that I/O devices 514 are also coupled to the control logic 472, 482. Legacy I/O devices 515 are coupled to the chipset 490.

Figure 6:
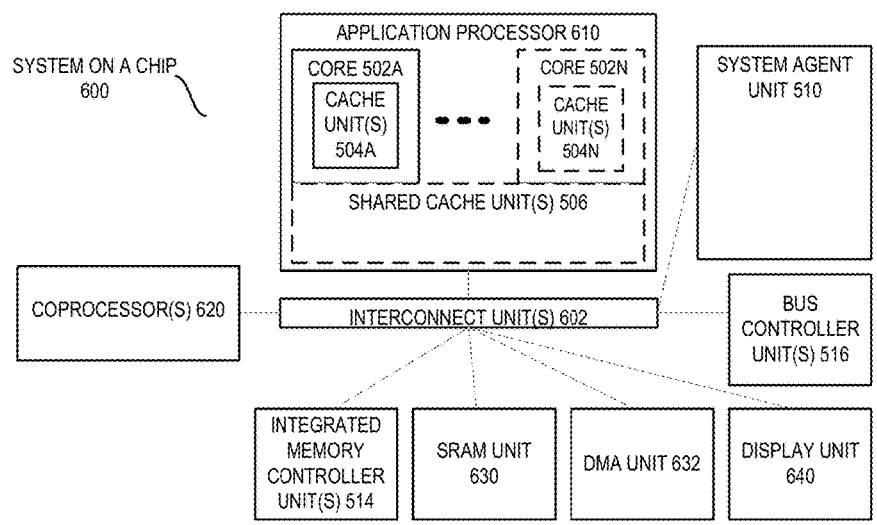
FIG. 6 illustrates a block diagram of a system on a chip (SoC) in accordance with an embodiment of the present invention.

Referring now to FIG. 6, shown is a block diagram of a SoC 600 in accordance with an embodiment of the present invention. Similar elements in FIG. 2 bear like reference numerals. Also, dashed lined boxes are optional features on more advanced SoCs. In FIG. 6, an interconnect unit(s) 602 is coupled to: an application processor 610 which includes a set of one or more cores 202A-N and shared cache unit(s) 206; a system agent unit 210; a bus controller unit(s) 216; an integrated memory controller unit(s) 214; a set or one or more coprocessors 620 which may include integrated graphics logic, an image processor, an audio processor, and a video processor; an static random access memory (SRAM) unit 630; a direct memory access (DMA) unit 632; and a display unit 640 for coupling to one or more external displays. In one embodiment, the coprocessor(s) 620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 430 illustrated in FIG. 4, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 7:
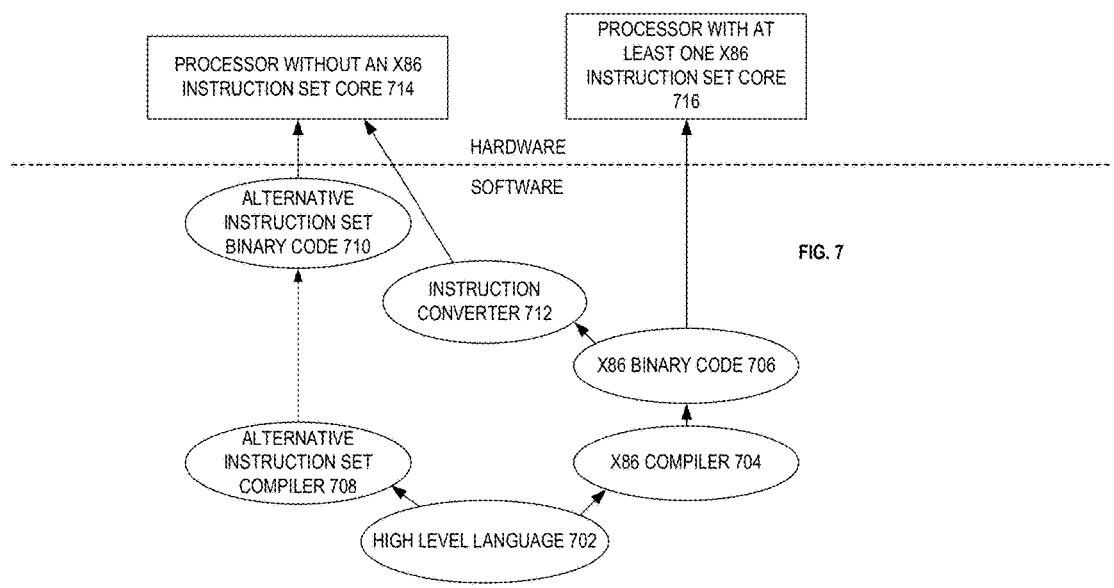
FIG. 7 illustrates a block diagram contrasting the use of a software instruction converter to convert binary instructions in a source instruction set to binary instructions in a target instruction set according to embodiments of the invention.

FIG. 7 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 7 shows a program in a high level language 702 may be compiled using an x86 compiler 704 to generate x86 binary code 706 that may be natively executed by a processor with at least one x86 instruction set core 716. The processor with at least one x86 instruction set core 716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 704 represents a compiler that is operable to generate x86 binary code 706 (e.g., object code) that can, with or without additional linkage processing, be executed on the processor with at least one x86 instruction set core 716. Similarly, FIG. 7 shows the program in the high level language 702 may be compiled using an alternative instruction set compiler 708 to generate alternative instruction set binary code 710 that may be natively executed by a processor without at least one x86 instruction set core 714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 712 is used to convert the x86 binary code 706 into code that may be natively executed by the processor without an x86 instruction set core 714. This converted code is not likely to be the same as the alternative instruction set binary code 710 because an instruction converter capable of this is difficult to make; however, the converted code will accomplish the general operation and be made up of instructions from the alternative instruction set. Thus, the instruction converter 712 represents software, firmware, hardware, or a combination thereof that, through emulation, simulation or any other process, allows a processor or other electronic device that does not have an x86 instruction set processor or core to execute the x86 binary code 706.

Apparatus and Method for a Scalable Testing Agent

Increases in SoC integration scope have resulted in a proportional increase in testing complexity. The cost of testing is not scaling with the Moore's law for increasing silicon density. Growing numbers of IP blocks in SoCs has resulted in test quality holes which may eventually lead to customer issues. For every generation of SoC, adding groups of product engineers to develop test content and solve test holes is not a viable solution.

Embodiments of the invention include a scalable, power efficient solution to these problems that reduces the overall industry capital investment towards achieving quality testing in SoCs. In one embodiment, this scalable architecture works as a plug-and-play mechanism on a primary scalable fabric (PSF) and it also works in tandem with secondary, side band ("SB") fabrics. It should be noted, however, that the embodiments of the invention are not limited to any particular type of interconnect fabric.

Figure 8:
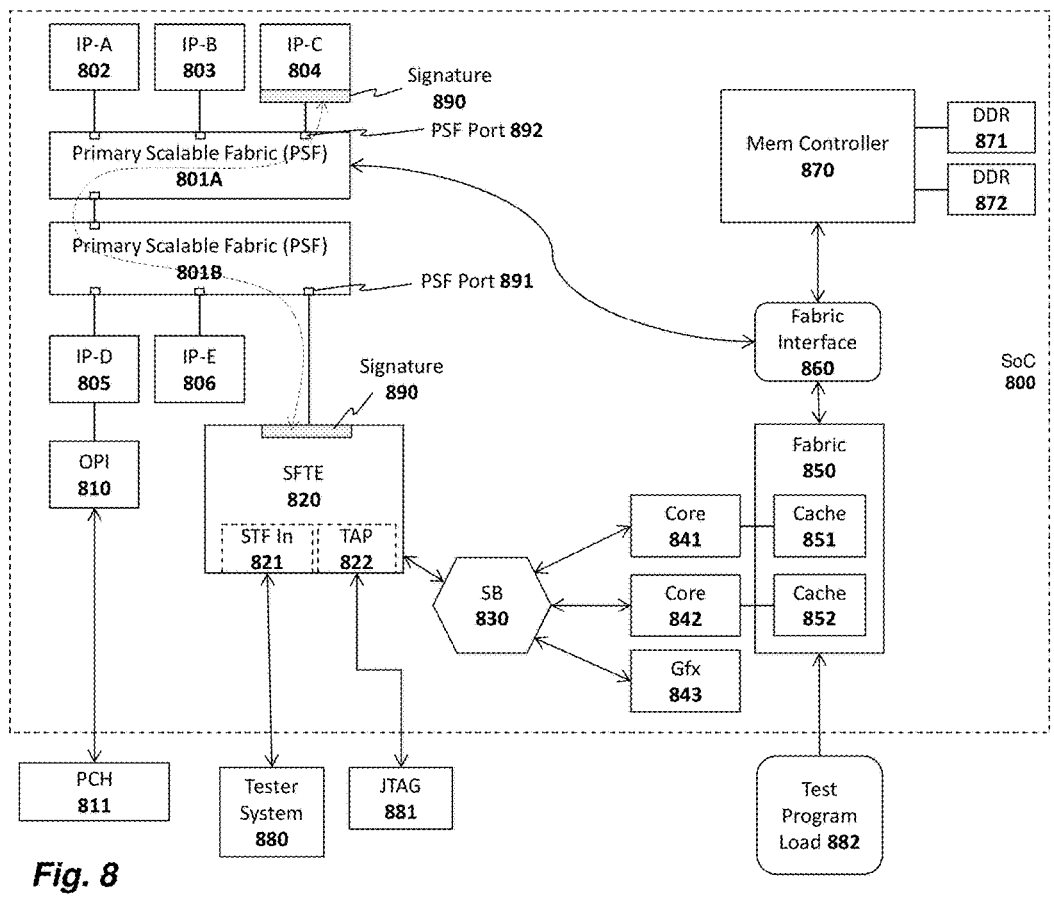
FIG. 8 illustrates an SoC architecture which includes a scalable fabric test engine (SFTE), or Test Controller.

One embodiment is illustrated in FIG. 8 which includes a plurality of IP blocks 802-805 communicatively coupled across a primary scalable fabric 801A-B within an SoC 800. A scalable fabric test engine (SFTE) 820 (also sometimes referred to as a "Test Controller") is also communicatively coupled to the PSF 801A-B and acts as an agent on the PSF 801A-B to implement IP-level and full-chip level testing operations as described herein. As illustrated, the SFTE 820 is also communicatively coupled to a plurality of cores 841-842 and graphics engines 843 via a sideband fabric 830 (also sometimes referred to as a "sideband interface fabric").

In one embodiment, the IP blocks 802-805 and the SFTE 820 communicate as agents over the PST 801A-B through a plurality of addressable ports (e.g., 891-892). For example, to enter into a transaction with a particular IP block 804, the SFTE 820 communicates over its own port 891 and identifies the addressable port 892 to which that IP block 804 is connected. In one embodiment, communication over the PSF 801A-B via these ports and communication over the sideband interface fabric 830 may be implemented according to the integrated on-chip system fabric (IOSF) specification, which defines signals for communication on these ports, protocols used for information exchange between agents, arbitration and flow control mechanisms used to initiate and manage information exchange, supported address decoding and translation capabilities, messaging for in-band or out-of-band communication, power management, test, validation and debug support.

The IOSF specification includes three independent interfaces that can be provided for each agent (e.g., each IP block and the SFTE 820), namely a primary interface, a sideband message interface and a testability and debug interface (design for test (DFT), design for debug (DFD) interface). According to the IOSF specification, an agent may support any combination of these interfaces. Specifically, an agent can support 0-N primary interfaces and 0-N sideband message interfaces. However, according to the specification, an agent must support at least one of these three interfaces. Note that the specific topology of the PSF 801A-B and sideband interface fabric 830 will be implementation specific and the underlying principles of the invention are not limited to any particular implementation. By way of example, a PSF or sideband interface fabric can be implemented as a bus, a hierarchical bus, a cascaded hub or so forth.

In one embodiment, the PSF 801A-B is used for all in-band communication between agents of IP blocks 802-806 and a memory controller 870 coupled to the PSF via 801A-B via a fabric interface (which may itself be integrated on the PSF via a port). In addition, the PSF 801A-B may be communicatively coupled to various central processing unit (CPU) components such as cores 841-842, associated caches 851-852, respectively, via a CPU interconnect fabric 850. In addition, in FIG. 8, one particular IP block 805 communicatively couples the PSF 801A-B to an off-package interface 810 which provides connectivity to off-package components such as a platform control hub 811 (for supporting various I/O operations). Thus, all transaction types including memory, input output (IO), configuration, and in-band messaging can be delivered via PSF 801A-B which acts as a high performance interface for data transferred between peers and/or communications with upstream components.

In various implementations, the PSF 801A-B implements a split transaction protocol to achieve maximum concurrency. That is, this protocol provides for a request phase, a grant phase, and a command and data phase. In one embodiment, the PSF 801A-B supports at least three basic request types: posted, non-posted, and completions. Generally, a posted transaction is a transaction which when sent by a source is considered complete by the source (i.e., the source does not receive a completion or other confirmation message regarding the transaction). One such example of a posted transaction may be a write transaction. In contrast, a non-posted transaction is not considered completed by the source until a return message is received, namely a completion. One example of a non-posted transaction is a read transaction in which the source agent requests a read of data. Accordingly, the completion message may provide the requested data.

In addition, in one embodiment, the PSF 801A-B uses distinct channels to provide a mechanism for independent data flows throughout the system. As will be described further, PSF 801A-B may itself include a primary master interface that initiates transactions and a target interface that receives transactions. The primary master interface can further be sub-divided into a request interface, a command interface, and a data interface. The request interface can be used to provide control for movement of a transaction's command and data. In various embodiments, PSF 801A-B may support PCI ordering rules and enumeration.

In one embodiment, sideband interface fabric 830 may be a standard mechanism for communicating all out-of-band information. In this way, special-purpose wires designed for a given implementation can be avoided, enhancing the ability of IP reuse across a wide variety of chips. Thus in contrast to an IP block that uses dedicated wires to handle out-of-band communications such as status, interrupt, power management, fuse distribution, configuration shadowing, test modes and so forth, a sideband interface fabric 830 according to the IOSF specification standardizes all out-of-band communication, promoting modularity and reducing validation requirements for IP reuse across different designs. In general, sideband interface fabric 830 may be used to communicate non-performance critical information, rather than for performance critical data transfers, which typically may be communicated via primary interface fabric. By way of example, in one embodiment of the invention, a test program 882 may be loaded into a cache 851-852 of a CPU and one or more cores 841-842 of the CPU use the sideband interface fabric 830 to program operation of the SFTE 820 with the test program 882. When the SFTE 820 runs the test program, the transactions are implemented across the higher performance PSF 801A-B.

In one embodiment, the SFTE 820, acting as an agent of the PSF 801A-B, is a portal between one or more tester systems 880 and the SoC 800, thus enabling a test system 880 that is external to the SoC 800 to deliver test data to the target IP block 804 by converting it into packets employed by the applicable fabric protocol for each type of fabric in the SoC 800. The packets are de-packetized (if necessary) into test stimulus at the destination IP block 804. In one embodiment, the response to the test stimulus is collected from the target IP 804 in the form of a signature 890 which may be transmitted back as one or more packets towards to the SFTE 820. The SFTE 820 or test system 880 may then compare the signature against known good signatures to determine whether the IP block 804 has passed the test or requires further debugging operations. In one embodiment, a hash operation is performed to generate the signature at the IP block 804. While any type of hash may be used, in one embodiment the hash comprises a primitive 32 bit polynomial $(x^{32}+x^{25}+x^{15}+x^{7}+x^{0})$. As shown in FIG. 8, the SFTE 820 may include a structured test framework interface 821 to form a link with the external tester system 880. In addition, the SFTE 820 may also include a test access port 822 to implement JTAG operations 881 in accordance with the Joint Test Action Group (JTAG) standards (e.g., IEEE 1149.1-1990).

One embodiment of the SFTE 820 receives IP-level testing or full-chip level testing vectors either from the CPU cores through the sideband fabric 830 or from an external tester 880 through structured test fabric (STF). In response to receipt of the test vectors, the SFTE 820 forms a fabric transaction with a pre-defined target IP block 804. The transactions reach the intended IP block 804 which may then perform the tests and generate a signature 890 over the results, which it transmits back to the SFTE 820. The SFTE decodes and categorizes the incoming responses into posted, non-posted, completion, data and command categories and accumulates them into respective multi-input serial registers (MISRs). As described in greater detail below, the MISRs are event-based intelligent signature accumulation blocks. The stored values may then be read out either by the CPU cores for internal comparison or by an external tester to compare against known good values and isolate bad units from good units.

Figure 9:
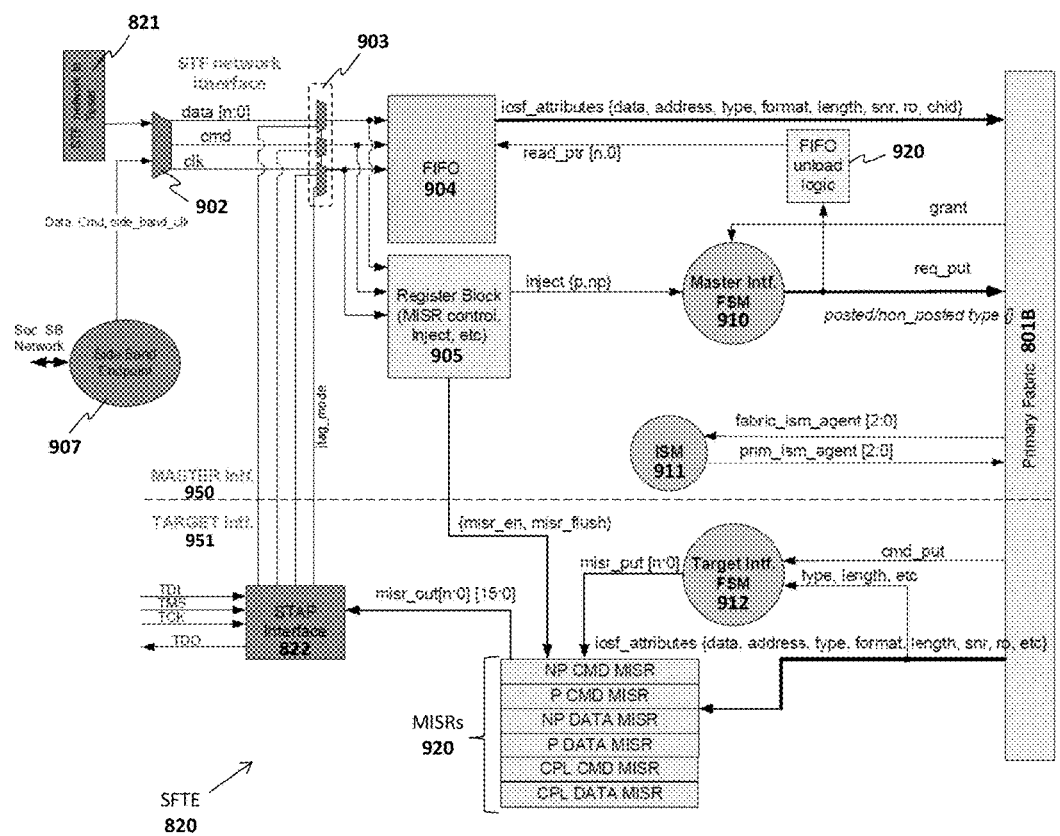
FIG. 9 illustrates one embodiment of a SFTE/test controller.

FIG. 9 illustrates additional details of one embodiment of the SFTE 820. As illustrated, the SFTE 820 can be logically subdivided into a master interface region 950 and a target interface region 951. In one embodiment, the master interface region 950 operates under control of a master interface finite state machine (FSM) 910 and Idle State Machine (ISM) 911 to control transactions being output over the PSF 801B. In particular, in one embodiment, the Master FSM 910 is responsible for putting a request onto the PSF 801B when an "Inject" command is received from a control register 905. The master FSM 910 may also be responsible for steering a first-in-first-out (FIFO) unload pointer circuit/logic 920 when a corresponding grant is received from the PSF 801B. Specifically, the FIFO unload circuit/logic 920 points to an entry in a FIFO 904 which may include commands and data to be transmitted over the PSF 801B to a target IP block. In one embodiment, the FIFO 904 is populated with commands and data received from a CPU core over the sideband endpoint 907 (e.g., via the sideband fabric 830 in FIG. 8) or from a tester system 880 over the structured test framework interface 820. A first MUX 902 is shown selecting input from either the structured test framework interface 820 or the side band endpoint 907. A second set of MUXes 903 then selects between this input and inputs from the structured TAP interface 822 (e.g., to implement operations in accordance with the JTAG standard as mentioned above). As illustrated, certain operands and control data may be stored in the register block 905 to be used to control the SFTE 820 (e.g., such as the inject command provided to the master interface FSM 910 as mentioned above).

In one embodiment, the ISM 911 comprises an agent to PSF state machine that exists on the primary channel to control when transactions are allowed on the interface. The ISM 911 also implements the underlying fabric access protocol clock gating and credit initialization. That is, the ISM 911 performs a credit-based arbitration mechanism to gain access to the PSF 801B (e.g., such as that used by IOSF). For example, a credit tracker associated with the corresponding channel of the target agent may be analyzed. In some embodiments, this credit tracker may be associated with both the channel as well as the request type. If sufficient credits exist, then the transaction can be sent to a transaction queue of the target channel for buffering until it is ready for processing by the target agent. Furthermore, because this transaction has consumed a queue resource of the target agent, credits associated with the target agent channel may be updated. For example, a credit tracker for the corresponding transaction queue may be decremented. It should be noted, however, that the underlying principles of the invention are not limited to any particular fabric arbitration mechanisms.

In one embodiment, the target interface 951 operates under control of a target interface FSM 912 to receive transactions from IP blocks over the PSF 801B. In particular, in one embodiment, the target interface FSM 912 comprises an N-state FSM which is responsible for polling for command put ("cmd_put") signals from the PSF 801B targeting the SFTE 820. In addition, the target interface FSM 912 enables the appropriate MISRs 920 based on the types of incoming transactions. In FIG. 9, for example, there are six different MISRs, three for storing commands (one for posted commands, one for non-posted commands, and one for completed commands), and three for storing data (one for posted data, one for non-posted data and one for completed data). In one embodiment, the MISR uses the same component instantiated multiple times based on the amount of address space per SoC.

Figure 10:
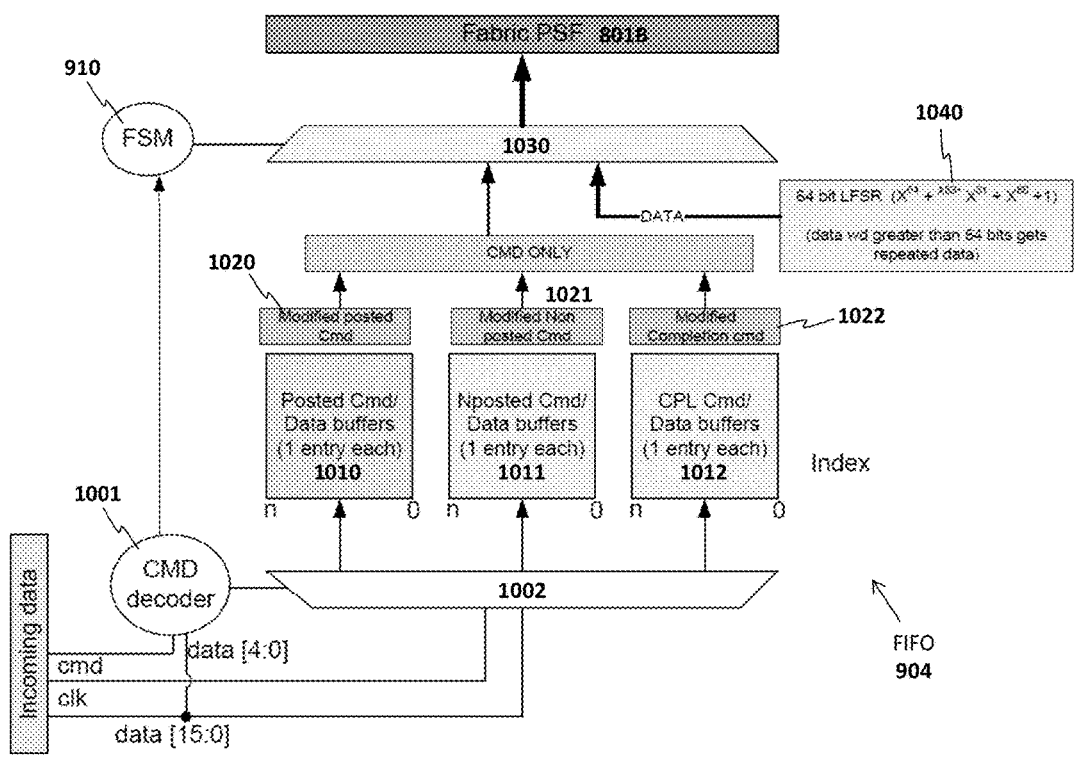
FIG. 10 illustrates techniques for categorizing, storing, and transmitting commands and data on a primary scalable fabric.

FIG. 10 illustrates one embodiment of the FIFO 904 which includes a set of commend/data buffers 1010 for posted transactions, a set of command data buffers for non-posted transactions 1011, and a set of command/data buffers 1012 for completed transactions. A command decoder 1001 controls a MUX 1002 in response to decoding each command, to communicatively couple the incoming data lines to one of the buffers 1010-1012 (i.e., based on whether the incoming transaction is posted, non-posted, or completed). In one embodiment, the FIFO 904 is capable of operating in a standard mode of operation and one or more non-standard operational modes. In standard operational mode, data and commands received from the external source (e.g., a tester machine, CPU core or TAP) are buffered in one of the buffers 1010-1012 from which they are selected from transmission over the PSF 1201B in accordance with the FSM 910 which controls an output MUX 1030.

In a SBFT (Structural based functional testing) mode, interaction with the external source should be minimal. Hence, in one embodiment, the SFTE 1220 is configured with "burst-mode" capabilities in which the FIFO 904 is issues a sequence of back to back operations (e.g., memory writes to a sequence of addresses, or memory reads), behaving like a small microcontroller. In one embodiment, for non-posted transactions it responds with a pseudo random or pre-programmed data 1040 as illustrated in FIG. 10, rather than using the data provided from the external source. Thus, only modified commands 1020-1022 are read from the command buffers 1010-1012 (i.e., modified because new data is being used) and combined with the internally-generated data 1040 prior to output over the PSF 1201B. This implementation saves significant time and cost because seeding data from an outside source is expensive.

Figure 11:
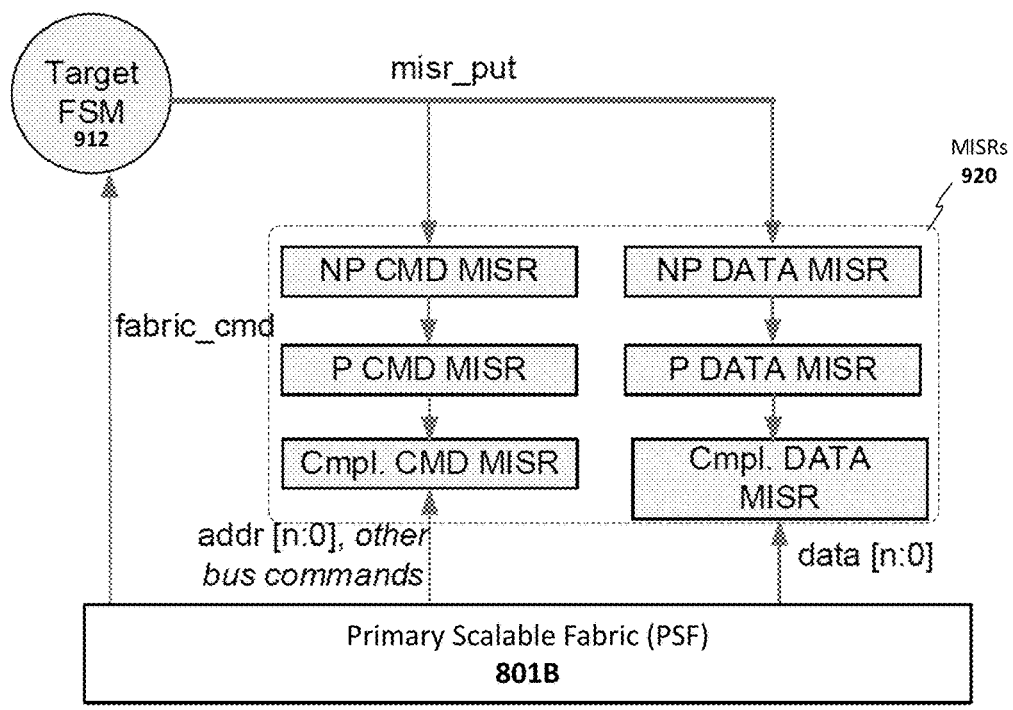
FIG. 11 illustrates one embodiment in which a set of multi-input serial registers (MISRs) are updated under control of a target finite state machine (FSM)

FIG. 11 illustrates additional details associated with the interaction between the target FSM 912, the MISRs 920 and the PSF 1201B. In particular, FIG. 11 illustrates how the target FSM 912 issues a "put" command to one of the MISRs in response to receipt of new command or data. For example, in response to receipt of posted data, the target FSM 912 issues the MISR put command to the MISR dedicated to storing posted data. Similarly, in response to receipt of a non-posted command, the target FSM 912 issues an MISR put command to the non-posted command MISR. Thus, in response to receipt of commands and data from the PSF 1201B, the target FSM 912 coordinates the manner in which commands and data are stored within each of the different MISRs 920.

One embodiment of the invention includes techniques for integrating IP-level tests within the SFTE architecture. In particular, this embodiment comprises a methodology and associated circuitry to convert an IP level test to a SFTE-based test. These tests may be run at the IP level or, with minor modifications, may be run at full-chip level.

Figure 12:
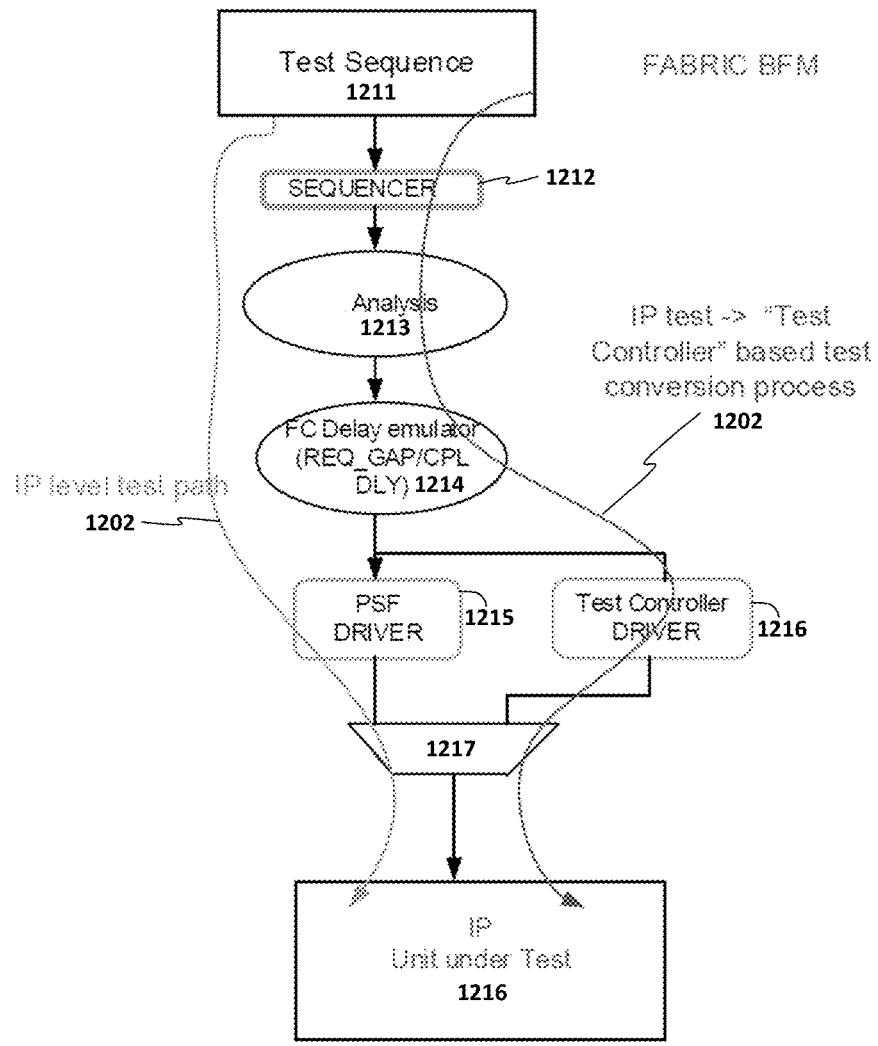
FIG. 12 illustrates one embodiment of a method in which a test sequence is implemented on a SFTE/test controller.

FIG. 12 illustrates an exemplary test sequence 1211 comprising program code for performing a sequence of test operations on one or more IP blocks. As illustrated, the test sequence 1211 may take two paths to reach the IP unit under test 1216: a first IP-level test path 1202 which does not utilize the SFTE 1220 described herein and a second path 1202 which utilizes the SFTE via interaction with a SFTE/test controller driver 1216.

In one embodiment, based on the test sequence 1211 (which may be prepared by a test writer) the sequencer 1212 generates test stimulus data and passes it to the analysis layer 1213 which ensures that stimulus generated by the sequencer is within specification and constrained correctly.

In cases where vectors are dumped from an IP level simulation but then transformed to full chip and run on silicon (bypassing the full chip simulation), a delay emulator 1214 emulating delays according to what would normally happen at full chip level. For example, for a read request from BFM (bus functional model), an IP block's 1216's response to the request would arrive to the BFM much faster than in the case of full chip or silicon environment. Thus, the delay emulator emulates the full chip delays in an IP level environment such that responses from the IP block 1216 (and stimulus directed to the IP block) are delayed according to be consistent with operation at full chip level.

In one embodiment, the PSF driver 1215 comprises a standard driver that communicates to the IP block 1216 using the IOSF protocol. Alternatively, a test controller driver 1216 may communicate with the IP block using the techniques described herein. As mentioned, tests may be launched from an external tester system 1280 or loaded via a CPU core 1241-1243 into the SFTE/Test Controller 1220 to test the target IP. In one embodiment, hooks are inserted into existing IP test sequences 1211. The test controller driver 1216, upon detecting the hooks, causes the test sequences to be implemented with the SFTE/test controller 1220. This effort saving feature facilitates the work of SoC test writing teams by ensuring IP quality with minimal effort.

The embodiments of the invention described herein provide a scalable testing agent architecture which may be integrated within existing SoCs to perform IP level testing and/or full-chip level testing. In contrast to existing systems, the embodiments described herein can be integrated as another IP agent and seamlessly plugged onto existing communication fabrics. Moreover, these embodiments do not require "test wrappers" to be built around the IP blocks under test as in some existing systems. The test controller can test any IP on the fabric or in the full-chip without any prior knowledge of that functional block. No direct pass-through is required between the IP block under test and the test controller because all the communication occurs on the standard interconnecting fabrics. In addition, the described embodiments can interface with the CPU cores through a sideband fabric unlike existing systems. In "burst-mode", the described SFTE/test controller 1220 is capable of generating and receiving transactions by itself without significant interaction from the tester system 1280. The IP block signature collection described herein is immune to non-determinism and this limits yield-loss resulting from "false negatives."

Moreover, the described SFTE/test controller can concurrently send transactions to the memory controller 1270 along with the CPU cores 1241-1242. This will emulate real system behavior of transactions coming from the south complex and north complex blocks test highly critical arbitration logic.

In one embodiment of the invention, the SFTE/test controller 1220 includes power management interface, allowing the SFTE to be awakened from a low power state on a need to run basis (e.g., it may be power gated by default). Thus, the described architecture provides for active and idle power reduction and is designed in compliance with low power SoC's power gating architectures, allowing the SFTE/test controller to be functional only when required.

In addition, since the SFTE/test controller 1220 can interact with the CPU cores 1241-1242, a secured assembly program can be loaded into the cache 1251-1252 and to execute a test through the SFTE/test controller 1220. Since no traffic is visible outside, this operation is extremely secure and can be exercised at customer locations.

In the foregoing specification, the embodiments of invention have been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

Embodiments of the invention may include various steps, which have been described above. The steps may be embodied in machine-executable instructions which may be used to cause a general-purpose or special-purpose processor to perform the steps. Alternatively, these steps may be performed by specific hardware components that contain hard-wired logic for performing the steps, or by any combination of programmed computer components and custom hardware components.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the Figures can be implemented using code and data stored and executed on one or more electronic devices (e.g., an end station, a network element, etc.). Such electronic devices store and communicate (internally and/or with other electronic devices over a network) code and data using computer machine-readable media, such as non-transitory computer machine-readable storage media (e.g., magnetic disks; optical disks; random access memory; read only memory; flash memory devices; phase-change memory) and transitory computer machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware. Throughout this detailed description, for the purposes of explanation, numerous specific details were set forth in order to provide a thorough understanding of the present invention. It will be apparent, however, to one skilled in the art that the invention may be practiced without some of these specific details. In certain instances, well known structures and functions were not described in elaborate detail in order to avoid obscuring the subject matter of the present invention. Accordingly, the scope and spirit of the invention should be judged in terms of the claims which follow.

What is claimed is:

1. A scalable test engine comprising:
    an input interface to receive commands and data from a processor core or an external test system, the commands and data to specify one or more test operations to be performed on one or more intellectual property (IP) blocks of a chip;
    a first circuit to establish communication with an IP block over a first interconnect fabric, the first circuit to transmit the one or more test operations to the IP block responsive to the received commands and data, the IP block to process the test operations and generate results; and a second circuit to receive the results from the IP block over the first interconnect fabric, the results to be provided from the second circuit to the processor core and/or the external test system for analysis, wherein the input interface comprises a sideband interface communicatively coupling the first and second circuits to the processor core.

2. The scalable test engine as in claim 1 wherein the first circuit includes a second interconnect fabric interface to communicatively couple the first circuit to the first interconnect fabric to which the IP block is also communicatively coupled.

3. The scalable test engine as in claim 2 wherein the first interconnect fabric comprises a primary scalable fabric (PSF) for interconnecting IP blocks within a semiconductor chip.

4. The scalable test engine as in claim 3 wherein the PSF comprises an Intel On-Chip System Fabric (IOSF).

5. The scalable test engine as in claim 2 wherein the first circuit is to implement a first finite state machine (FSM) to coordinate communication of the commands and data over the second interconnect fabric to the IP block.

6. The scalable test engine as in claim 5 wherein the first circuit further comprises:

a plurality of command/data buffers, one or more of the command/data buffers to store a particular type of command/data received over the input interface.

7. The scalable test engine as in claim 6 wherein a first command/data buffer is to store posted commands/data, a second command/data buffer is to store non-posted commands/data, and a third command/data buffer is to store completed commands/data.

8. The scalable test engine as in claim 5 further comprising a data generation circuit to generate data to be transmitted to the IP block in combination with a command from one of the command/data buffers under control by the first FSM.

9. The scalable test engine as in claim 1 wherein the results comprise one or more signatures generated at the IP block responsive to execution of the test operations, the IP block to transmit the one or more signatures to the second circuit over the first interconnect fabric.

10. The scalable test engine as in claim 9 wherein the signatures are to be compared against known good signatures to determine whether the IP block has passed the test operations.

11. The scalable test engine as in claim 1 wherein the first interconnect fabric is communicatively coupled to a memory controller to establish communication between a system memory and the first and second circuits.

12. The scalable test engine as in claim 1 further comprising:

an on-chip test access port (TAP) to implement a stateful protocol in accordance with a Joint Test Action Group (JTAG) standard.

13. The scalable test engine as in claim 1 wherein the second circuit comprises a plurality of multi-input serial registers (MISRs) to be updated with the results under control of a target finite state machine (FSM).

14. The scalable test engine as in claim 1 wherein the first circuit does not require a test wrapper to be built around the IP block.

15. A system-on-a-chip (SoC) comprising:

a plurality of intellectual property (IP) blocks interconnected on first interconnect fabric;

at least one processor core to execute instructions and process data;

an input interface to receive commands and data from the processor core or an external test system, the commands and data to specify one or more test operations to be performed on one or more IP blocks of a chip;

a first circuit to establish communication with an IP block over the first interconnect fabric, the first circuit to transmit the one or more test operations to the IP block responsive to the received commands and data, the IP block to process the test operations and generate results; and a second circuit to receive the results from the IP block over the first interconnect fabric, the results to be provided from the second circuit to the processor core and/or the external test system for analysis, wherein the input interface comprises a sideband interface communicatively coupling the first and second circuits to the processor core.

16. The SoC as in claim 15 wherein the first circuit includes a second interconnect fabric interface to communicatively couple the first circuit to the first interconnect fabric to which the IP block is also communicatively coupled.

17. The SoC as in claim 16 wherein the first interconnect fabric comprises a primary scalable fabric (PSF) for interconnecting IP blocks within a semiconductor chip.

18. The SoC as in claim 17 wherein the PSF comprises an Intel On-Chip System Fabric (IOSF).

19. The SoC as in claim 16 wherein the first circuit is to implement a first finite state machine (FSM) to coordinate communication of the commands and data over the second interconnect fabric to the IP block.

20. The SoC as in claim 19 wherein the first circuit further comprises:

a plurality of command/data buffers, one or more of the command/data buffers to store a particular type of command/data received over the input interface.

21. The SoC as in claim 20 wherein a first command/data buffer is to store posted commands/data, a second command/data buffer is to store non-posted commands/data, and a third command/data buffer is to store completed commands/data.

22. The SoC as in claim 19 further comprising a data generation circuit to generate data to be transmitted to the IP block in combination with a command from one of the command/data buffers under control by the first FSM.

23. The SoC as in claim 15 wherein the results comprise one or more signatures generated at the IP block responsive to execution of the test operations, the IP block to transmit the one or more signatures to the second circuit over the first interconnect fabric.

24. The SoC as in claim 23 wherein the signatures are to be compared against known good signatures to determine whether the IP block has passed the test operations.

25. The SoC as in claim 15 wherein the first interconnect fabric is communicatively coupled to a memory controller to establish communication between a system memory and the first and second circuits.

* * * * *